(12) United States Patent
Misono et al.

(10) Patent No.: US 10,300,821 B2
(45) Date of Patent: May 28, 2019

(54) VEHICLE SEAT HAVING CUSHION PAN AND METAL FRAME

(71) Applicant: HONDA MOTOR CO., LTD., Tokyo (JP)

(72) Inventors: Taiji Misono, Wako (JP); Masaki Shimazu, Wako (JP); Toshimitsu Mizukoshi, Wako (JP); Akira Nakajima, Wako (JP); Yuki Fukuda, Wako (JP); Hiromitsu Nagatomo, Wako (JP); Kota Yamamoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/935,242

(22) Filed: Mar. 26, 2018

(65) Prior Publication Data

US 2018/0272909 A1 Sep. 27, 2018

(30) Foreign Application Priority Data

Mar. 24, 2017 (JP) .................................. 2017-059576

(51) Int. Cl.
*B60N 2/68* (2006.01)
*B60N 2/70* (2006.01)

(52) U.S. Cl.
CPC ............. *B60N 2/686* (2013.01); *B60N 2/70* (2013.01)

(58) Field of Classification Search
CPC .................................. B60N 2/70; B60N 2/686
USPC ..................................................... 297/452.56
See application file for complete search history.

(56) References Cited

U.S. PATENT DOCUMENTS

| | | | | |
|---|---|---|---|---|
| 3,117,819 | A * | 1/1964 | Kudriavetz, Jr. | A47C 7/282 160/378 |
| 4,147,336 | A * | 4/1979 | Yamawaki | B60N 2/7041 267/111 |
| 6,213,557 | B1 * | 4/2001 | Aebischer | A47C 7/185 297/452.55 |
| 8,393,432 | B2 * | 3/2013 | Boyarski | B60K 28/04 180/273 |
| 2016/0150885 | A1 * | 6/2016 | Peterson | A47C 31/023 297/408 |

FOREIGN PATENT DOCUMENTS

| | | |
|---|---|---|
| EP | 0562453 A1 | 9/1993 |
| JP | 2016-16715 A | 2/2016 |

OTHER PUBLICATIONS

Notification of Reasons for Refusal dated Oct. 31, 2018, issued in counterpart Japanese Application No. 2017-059576, with English translation. (4 pages).

* cited by examiner

*Primary Examiner* — Milton Nelson, Jr.
(74) *Attorney, Agent, or Firm* — Westerman, Hattori, Daniels & Adrian, LLP (57) ABSTRACT

A cushion pan includes a front and rear support part that extends from the front end to the rear end of a seat cushion and faces the lower face of the femoral region of an occupant and side support parts that extend obliquely upward from both right and left side edges of the front and rear support part and face side faces of the buttocks of the occupant. In addition, the front and rear support part and the side support parts may be integrally formed to reduce the number of components and assembling steps.

3 Claims, 6 Drawing Sheets

VEHICLE SEAT HAVING CUSHION PAN AND METAL FRAME

CROSS-REFERENCE OF RELATED APPLICATION

This application claims priority of Japanese Patent Application No. 2017-059576 filed in Japan on Mar. 24, 2017, the entire contents of which are incorporated herein by reference.

TECHNICAL FIELD

The present invention relates to a vehicle seat that includes a cushion pan that is made of an elastic synthetic resin and disposed in a central opening of a metal seat frame, and supports the lower face of a seat pad of a seat cushion by the cushion pan.

BACKGROUND ART

There is known, by JP 2016-16715 A described below, a technique that includes a cushion pan for supporting the lower face of a seat pad as a cushion material, the cushion pan being integrally formed with a central part of a metal seat frame of a seat cushion of a vehicle seat, and improves the holding property for the buttocks of an occupant by depressing a central part of the cushion pan downward.

In the above technique, the cushion pan that supports the lower face of the seat pad is made of metal and integrally formed with the seat frame. Thus, not only the weight of the cushion pan is large, which becomes a factor in increasing the weight of the vehicle seat, but also the cushion pan is hardly deformed due to its high stiffness, which deteriorates the cushioning property. Thus, there is a problem of deterioration in the seating comfortability.

There are needs of, in view of the above circumstances, reducing the weight of a cushion pan that holds the lower face of a seat pad of the vehicle seat, ensuring the support property, and improving the cushioning property.

SUMMARY OF INVENTION

To achieve the above object, according to a first embodiment of the invention, there is provided a vehicle seat that includes a cushion pan that is made of an elastic synthetic resin and disposed in a central opening of a seat frame made of metal, and supports a lower face of a seat pad of a seat cushion by the cushion pan, wherein the cushion pan includes a front and rear support part that extends from a front end to a rear end of the seat cushion and faces a lower face of a femoral region of an occupant and side support parts that extend obliquely upward from both right and left side edges of the front and rear support part and face side faces of buttocks of the occupant, and the front and rear support part and the side support parts are integrally formed.

Further, according to a second embodiment of they invention, in addition to the structure of the first embodiment, there is provided the vehicle seat, wherein a first elastic body extending in a lateral (vehicle width) direction is integrally formed with the side support parts, and a second elastic body extending in a longitudinal (front-to-rear) direction is integrally formed with the front and rear support part.

Further, according to a third embodiment of the invention, in addition to the structure of the second embodiment, there is provided the vehicle seat, wherein the first elastic body is disposed on an upper side of the second elastic body, and the first elastic body is disposed at a position that avoids an ischium of the occupant.

Further, according to a fourth embodiment of the invention, in addition to the structure of anyone of the first to third embodiments, there is provided the vehicle seat, further including cover members that are fixed to the seat frame and continuous from outer sides in a lateral direction of the side support parts, wherein front ends of the cover members are aligned with front ends of the side support parts, and the cover members and the side support parts support the lower face of the seat pad in cooperation with each other.

Further, according to a fifth embodiment of the invention, in addition to the structure of the fourth embodiment, there is provided the vehicle seat, wherein the side support parts have no direct contact with the cover members.

EFFECT OF EMBODIMENTS OF THE INVENTION

According to the structure of the first embodiment, since the cushion pan made of an elastic synthetic resin is disposed in the central opening of the seat frame made of metal, and the lower face of the seat pad of the seat cushion is supported by the cushion pan, it is possible not only to reduce the weight as compared to a cushion pan made of metal, but also to improve the cushioning property by elastic deformation of the cushion pan caused by the weight of the occupant. Further, the cushion pan includes the front and rear support part that extends from the front end to the rear end of the seat cushion and faces the lower face of the femoral region of an occupant and side support parts that extend obliquely upward from both right and left side edges of the front and rear support part and face side faces of the buttocks of the occupant. Thus, it is possible to improve the support property by stably supporting a wide area from the lower face to the right and left side faces of the seat pad by the cushion pan and also improve the seating comfortability by holding the lower face of the femoral region and the side faces of the buttocks of the occupant at the same time. In addition, since the front and rear support part and the side support parts are integrally formed, it is possible to reduce the number of components and assembling man-hours.

Further, according to the structure of the second embodiment, the first elastic body extending in the lateral direction is integrally formed with the side support parts, and the second elastic body extending in the longitudinal direction is integrally formed with the front and rear support part. Thus, it is possible to improve the support property by surface-supporting the lower face of the seat pad by the cushion pan and also further improve the cushioning property by elastic deformation of the cushion pan made of a synthetic resin and elastic deformation of the first and second elastic bodies.

Further, according to the structure of the third embodiment, the first elastic body is disposed on the upper side of the second elastic body, and the first elastic body is disposed at the position that avoids the ischium of the occupant. Thus, it is possible to prevent the first elastic body from giving an uncomfortable feeling caused by a pressure concentration on the ischium part of the occupant.

Further, according to the structure of the fourth embodiment, the cover members that are fixed to the seat frame and continuous from the outer sides in the lateral direction of the side support parts are provided, the front ends of the cover members are aligned with the front ends of the side support parts, and the cover members and the side support parts support the lower face of the seat pad in cooperation with each other. Thus, it is possible to improve the seating comfortability by making a reaction force received by the side faces of the buttocks of the occupant constant by uniformly supporting the lower face of the seat pad by the cover members and the side support parts.

Further, according to the structure of the fifth embodiment, since the side support parts have no contact with the cover members, it is possible to prevent an unusual sound from being produced by contact of the side support parts with the cover members when the occupant is seated.

DETAILED DESCRIPTION OF EMBODIMENTS OF THE INVENTION

[First Embodiment]

Hereinbelow, a first embodiment of the present invention will be described with reference to FIGS. 1 to 5. Note that a longitudinal direction, a lateral direction, and a vertical direction in the present specification are defined relative to an occupant seated on a driver's seat.

As illustrated in FIGS. 1 to 4, a seat 11 for the driver's seat or a passenger seat of an automobile is provided with a seat cushion 12 which supports the buttocks and the femoral region of an occupant, a seat back 13 which supports the back of the occupant, and a headrest 14 which supports the head of the occupant. The seat cushion 12 is movably supported in the longitudinal direction with respect to a pair of right and left guide rails 15, 15 which is disposed on a floor panel, and the seat back 13 is swingably supported in the longitudinal direction with respect to the seat cushion 12 through a reclining shaft 16.

A seat frame 17 is provided with a pair of right and left plate-like side frames 18, 18, a plate-like front frame 19 which connects the front ends of the right and left side frames 18, 18 in the lateral direction, and a rear frame 20 which is made of a pipe material and connects the rear ends of the right and left side frames 18, 18 in the lateral direction, and formed in a rectangular frame shape whose central part is open in the plan view. Sliders 21, 21 are disposed on the respective right and left side frames 18, 18 on the lower side thereof and slidably supported in the longitudinal direction by the right and left guide rails 15, 15.

Figure 1:
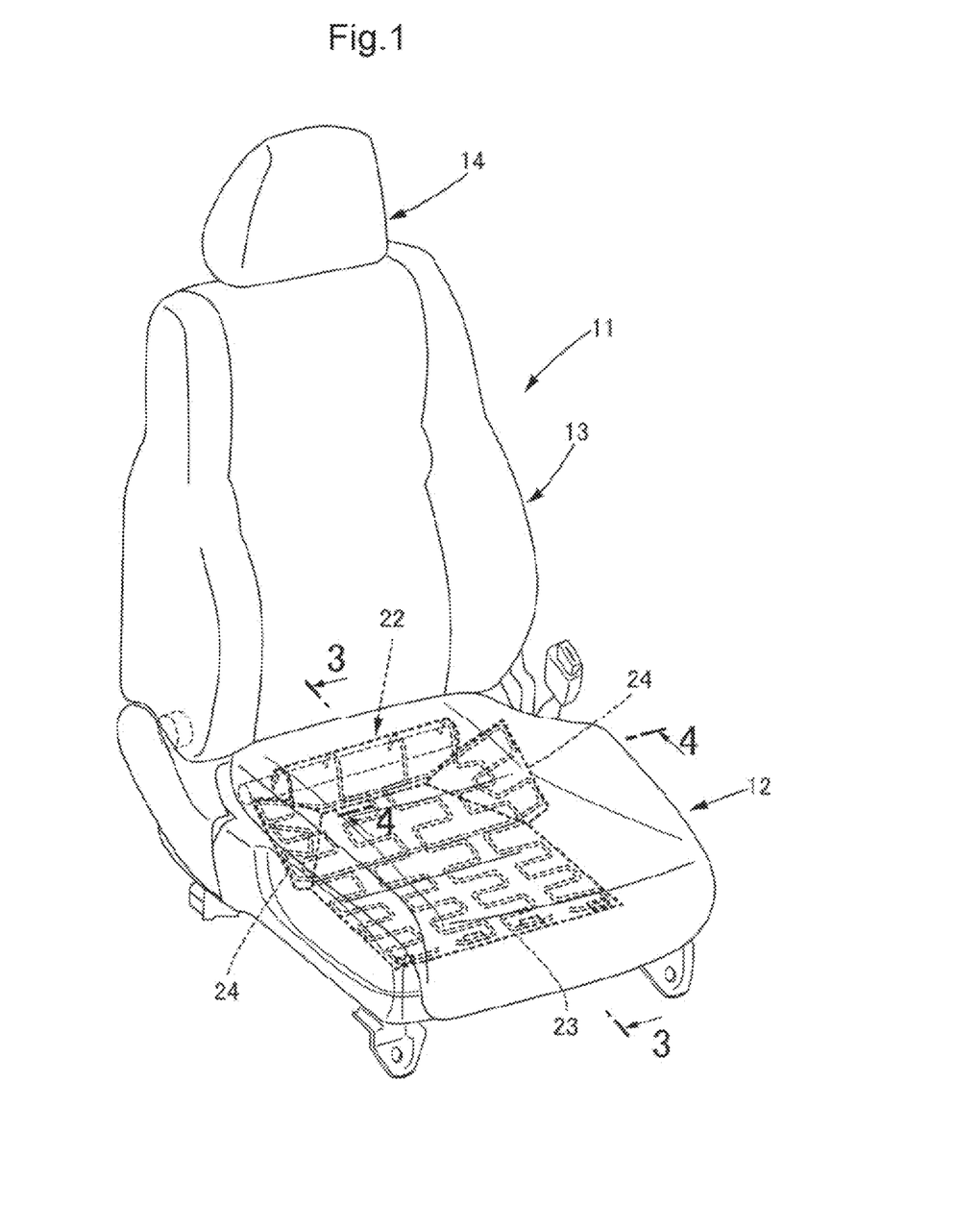
FIG. 1 is a perspective view of an automobile seat (first embodiment).
Figure 2:
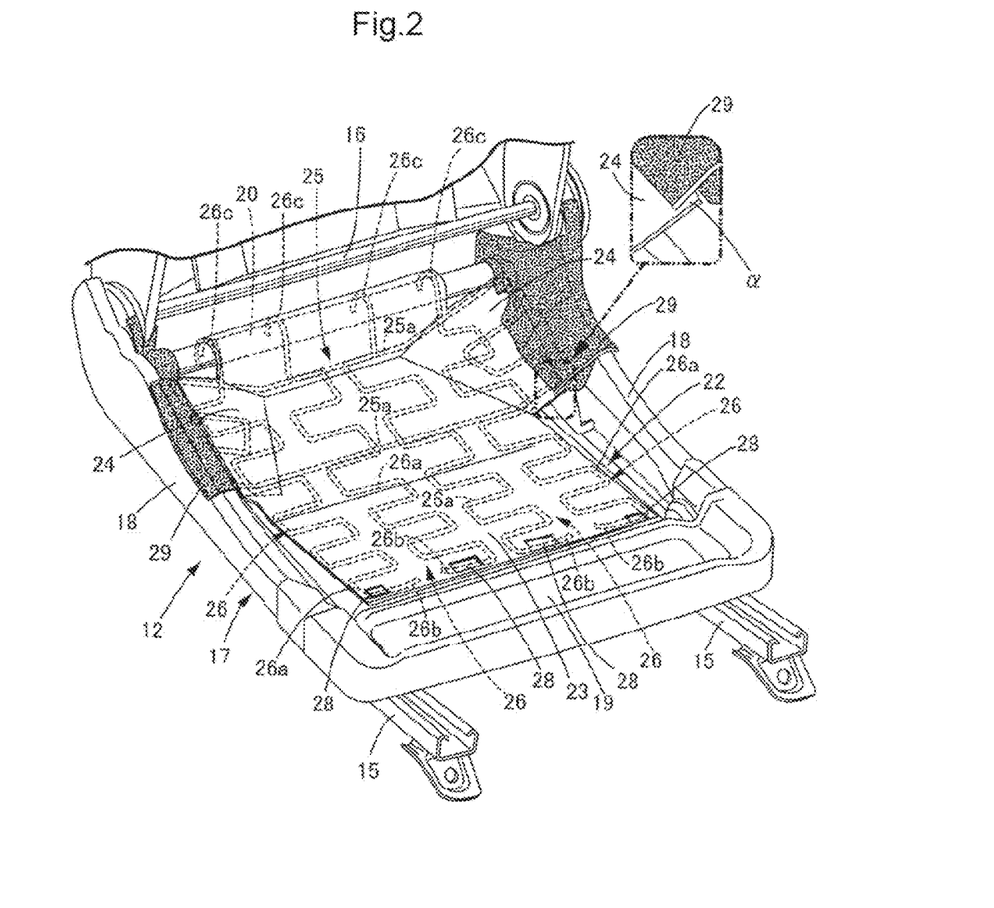
FIG. 2 is a view of a seat cushion with a seating surface detached (first embodiment).
Figure 3:
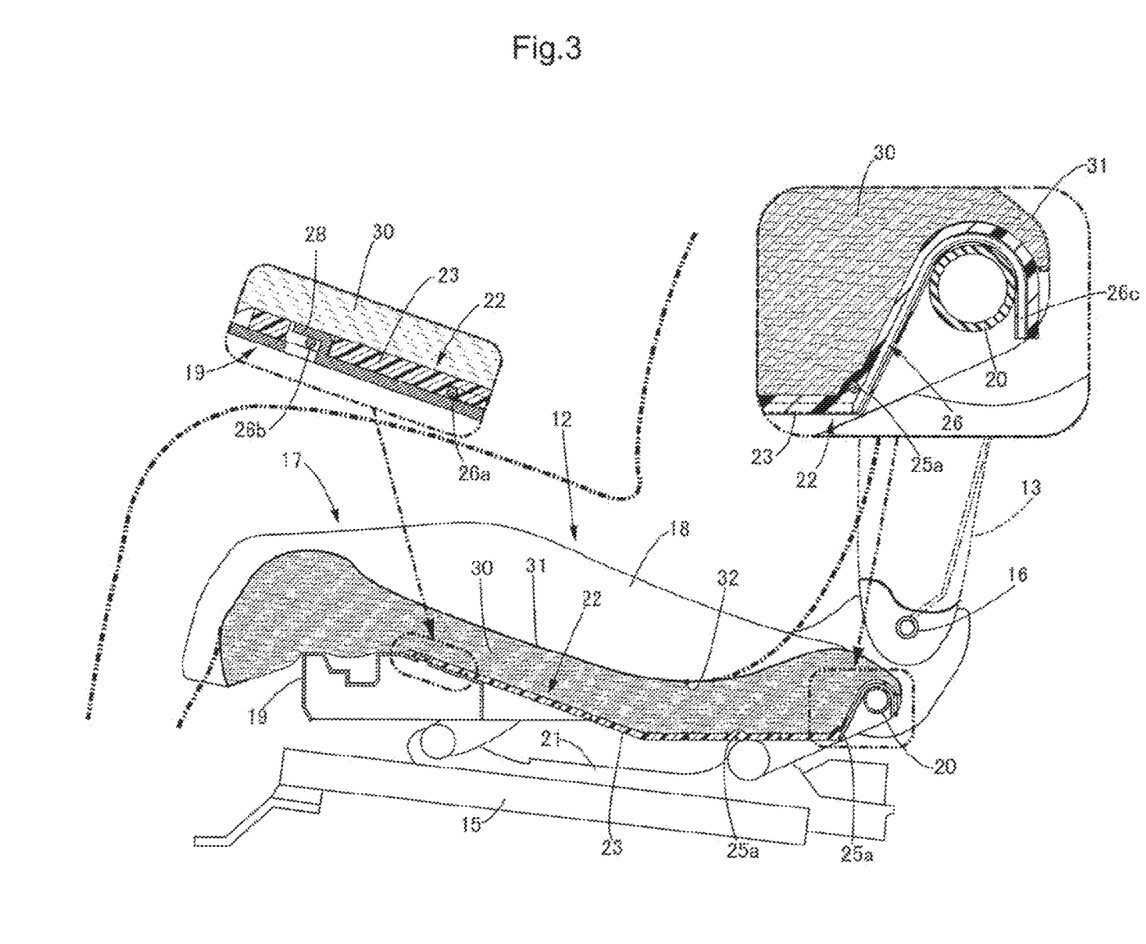
FIG. 3 is a sectional view taken along line 3-3 of FIG. 1 (first embodiment).
Figure 5:
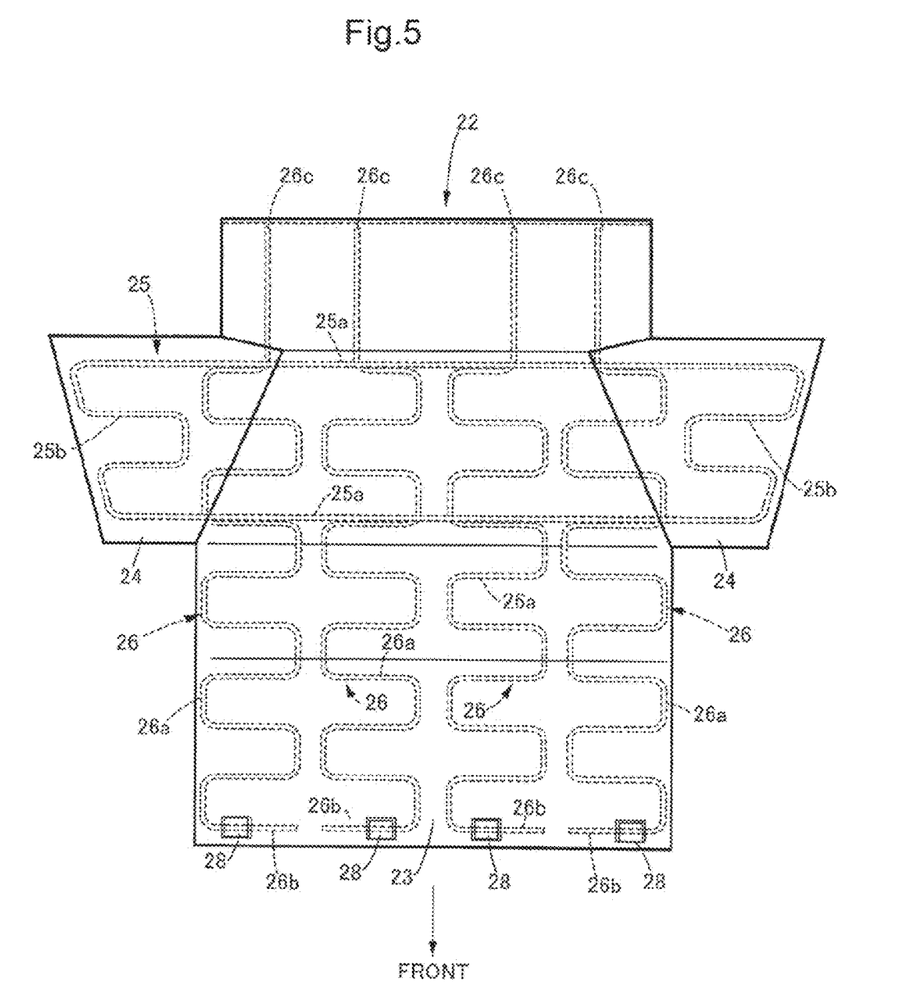
FIG. 5 is a perspective view of a cushion pan (first embodiment).

As illustrated in FIGS. 2, 3, and 5, the central opening of the seat frame 17 is covered with a cushion pan 22 which is made of an elastic synthetic resin and formed in a plate-like shape. The cushion pan 22 is provided with a front and rear support part 23 which is formed in a substantially rectangular shape elongated in the longitudinal direction and a pair of right and left side support parts 24, 24 each of which is formed in a substantially trapezoidal shape and projects outward in the lateral direction from the central part in the longitudinal direction of each of right and left side edges of the front and rear support part 23. The front and rear support part 23 and the right and left side support parts 24, 24 are integrally formed.

When the cushion pan 22 is integrally formed using a synthetic resin, a first elastic body 25 and second elastic bodies 26 each of which is made of a spring material are inserted inside thereof. The first elastic body 25 is formed in a rectangular frame shape elongated in the lateral direction, provided with a pair of front and rear main body parts 25a, 25a each of which linearly extends in the lateral direction and coupling parts 25b, 25b which couple the ends of the main body parts 25a, 25a in a zigzag shape in the longitudinal direction, and inserted into the cushion pan 22 in such a manner that the first elastic body 25 extends to the right and left support parts 24, 24 across the front and rear support part 23.

Each of the four second elastic bodies 26 made of a spring material is provided with a main body part 26a which extends in the longitudinal direction in a zigzag shape, a fixed part 26b which is disposed on the front end of the main body part 26a, and a locked part 26c which is disposed on the rear end of the main body part 26a, and the four second elastic bodies 26 are disposed side by side in the lateral direction in parallel to each other. The first elastic body 25 disposed in an overlapping manner on the upper side of the second elastic bodies 26 at an intersection between the first elastic body 25 and the second elastic bodies 26.

The fixed parts 26b on the front ends of the four second elastic bodies 26 are fixed to the seat frame 17 by four fixing members 28 which are formed by cutting and raising the front frame 19, and the locked parts 26c each of which is curved in a circular arc shape on the rear ends of the four second elastic bodies 26 are hooked and fixed onto the rear frame 20 made of a pipe material together with the rear edge of the front and rear support part 23. Note that the fixed parts 26b on the front ends of the second elastic bodies 26 may be fixed to the front frame 19 with the same structure as the locked parts 26c on the rear ends instead of fixing to the front frame 19 with the fixing members 28.

Figure 4:
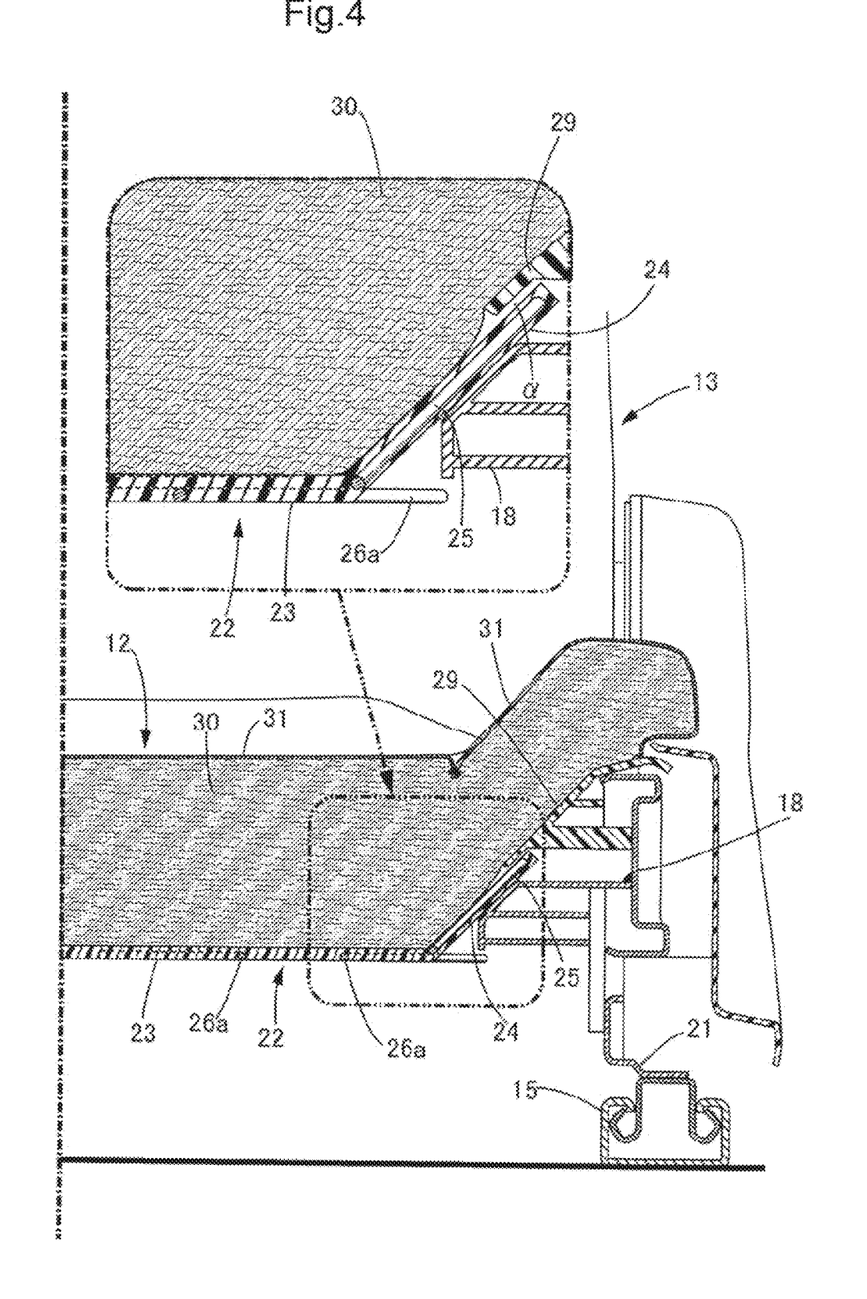
FIG. 4 is a sectional view taken along line 4-4 of FIG. 1 (first embodiment).

As illustrated in FIGS. 2 and 4, when the cushion pan 22 is viewed in the longitudinal direction, the right and left side support parts 24, 24 are disposed in an inclined manner with the outer sides in the lateral direction located high with respect to the front and rear support part 23 which is horizontally disposed. Cover members 29, 29 made of a synthetic resin are fixed to the right and left side frames 18, 18. The cover members 29, 29 are inclined in substantially the same directions as the inclined directions of the side support parts 24, 24, and inner ends in the lateral direction of the cover members 29, 29 overlap the upper faces of the outer ends in the lateral direction of the side frames 18, 18. In this case, a clearance α (refer to FIGS. 2 and 4) which extends in the longitudinal direction is formed between the end of each of the cover members 29, 29 and the end of each of the side support parts 24, 24, the ends overlapping in the vertical direction. The cover members 29, 29 have no contact with the side support parts 24, 24 by the clearance α.

As illustrated in FIGS. 3 and 4, a main body part of the seat cushion 12 includes a soft seat pad 30 which is made of a foamed urethane resin and covered with a skin material 31 which is made of cloth or leather, and the lower face of the seat pad 30 abuts against the upper faces of the cushion pan 22, the front frame 19, and the right and left cover members 29, 29 so as to be supported thereon.

Next, the action of the first embodiment of the present invention having the above structure will be described.

A large part of the weight of an occupant who is seated on the seat 11 is transmitted from the skin material 31 of the seat cushion 12 to the seat pad 30, further transmitted from the seat pad 30 to the seat frame 17 through the cushion pan 22 and the right and left cover members 29, 29, and supported by the floor panel in the end. At this time, a load from the lower face of the femoral region of the occupant is supported by the front and rear support part 23 of the cushion pan 22, and a load from the side faces of the buttocks of the occupant is supported by the right and left support parts 24, 24 of the cushion pan 22 and the right and left cover members 29, 29. Thus, it is possible to support a wide area from the lower face to the right and left side faces of the seat pad 30 by the cushion pan 22 and the cover members 29, 29 and support the lower face of the femoral region and the side faces of the buttocks of the occupant at the same time to improve the seating comfortability. Further, since the front and rear support part 23 and the right and left side support parts 24, 24 are integrally formed, it is possible to reduce the number of components and assembling man-hours of the cushion pan 22.

Further, the right and left cover members 29, 29 which are fixed to the seat frame 17 are continuous from the outer sides in the lateral direction of the right and left side support parts 24, 24 of the cushion pan 22, the front ends of the cover members 29, 29 are aligned with the front ends of the side support parts 24, 24, and the cover members 29, 29 and the side support parts 24, 24 support the lower face of the seat pad 30 in cooperation with each other. Thus, it is possible to further improve the seating comfortability by making a reaction force received by the side faces of the buttocks of the occupant constant by uniformly supporting the lower face of the seat pad 30 by the cover members 29, 29 and the side support parts 24, 24.

In addition, the front ends and the rear ends of the side support parts 24, 24 of the cushion pan 22 have the clearance α with respect to the cover members 29, 29 (refer to FIGS. 2 and 4). Thus, it is possible to prevent an unusual sound from being produced by contact of the front ends and the rear ends of the side support parts 24, 24 with the ends of the cover members 29, 29 when the occupant is seated.

If the cushion pan 22 is a rigid body, a reaction force received by the seat pad 30 from the cushion pan 22 is large, which may deteriorate the seating comfortability. When the cushion pan 22 is eliminated in order to avoid the deterioration in the seating comfortability, and the lower face of the seat pad 30 is supported by a plurality of spring materials instead of the cushion pan 22, the lower face of the seat pad 30 cannot be uniformly supported, and the seat pad 30 projects downward through a gap between adjacent spring materials. Thus, the support for the seat pad 30 becomes unstable, which may deteriorate the seating comfortability.

However, according to the present embodiment, the first elastic body 25 which extends in the lateral direction is integrally formed with the front and rear support part 23 and the side support parts 24, 24 of the cushion pan 22 which is formed in a plate-like shape using an elastic synthetic resin, and the second elastic bodies 26 each of which extends in the longitudinal direction are integrally formed with the front and rear support part 23. Thus, it is possible to improve the support property by surface-supporting the lower face of the seat pad 30 by the cushion pan 22 and also improve the cushioning property by elastic deformation of the cushion pan 22 made of a synthetic resin and the first and second elastic bodies 25, 26.

Further, the first elastic body 25 is disposed on the upper side of the second elastic bodies 26. Thus, it is possible to increase the durability of the second elastic bodies 26 which are disposed on the lower side of the first elastic body 25 and has the main body parts 26a each having a easily deformable zigzag shape by supporting the weight of the occupant by the main body parts 25a, 25a of the first elastic body 25 each of which is formed in a linear shape and difficult to elongate and deform. Even when the first elastic body 25 is disposed in an overlapping manner on the upper side of the second elastic bodies 26 in this manner, the first elastic body 25 is disposed at a position that avoids the ischium 32 of the occupant (refer to FIG. 3). Thus, it is possible to prevent the first elastic body 25 from giving an uncomfortable feeling caused by a pressure concentration on the ischium part of the occupant.

[Second Embodiment]

Figure 6:
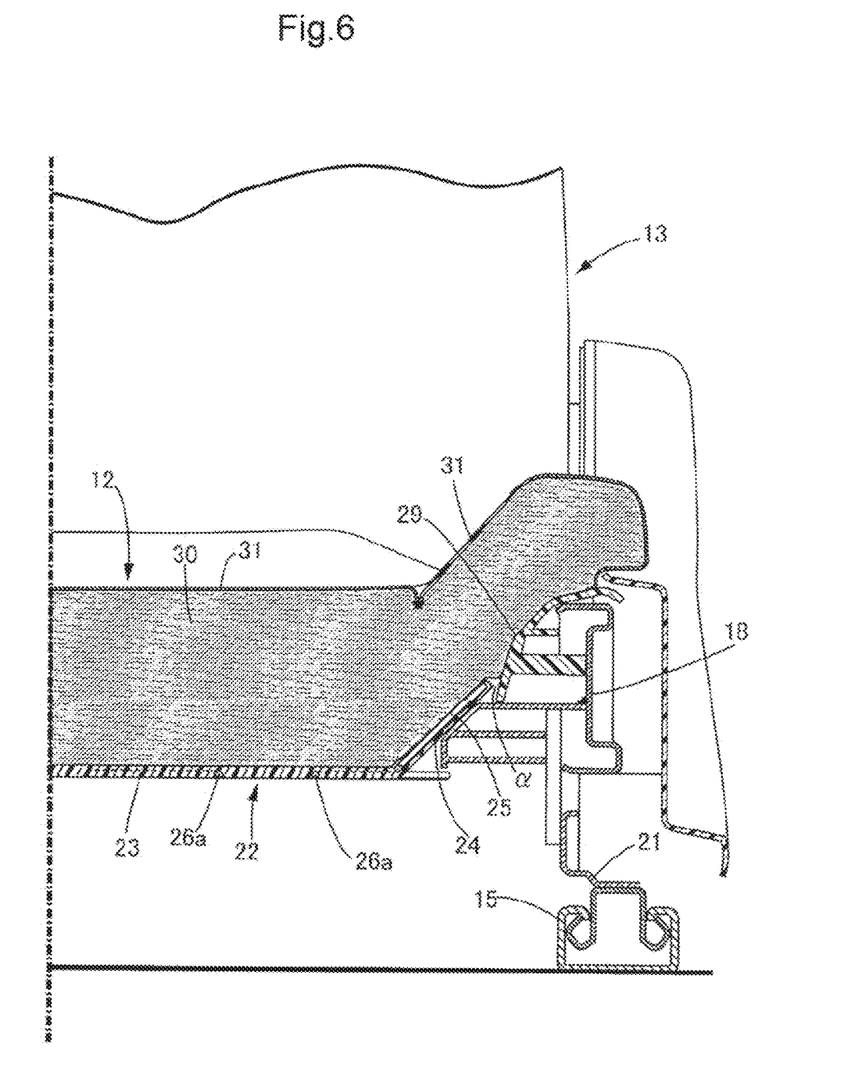
FIG. 6 is a view corresponding to FIG. 4 (second embodiment).

Next, a second embodiment of the present invention will be described with reference to FIG. 6.

In the first embodiment, the end of the cover member 29 overlaps the end of the side support part 24 of the cushion pan 22 from the upper side with the clearance α interposed therebetween. On the other hand, in the second embodiment, the end of a cover member 29 faces the end of a side support part 24 of the cushion pan 22 with a clearance α in the lateral direction interposed therebetween. Accordingly, the cover members 29, 29 have not contact with the side support parts 24, 24.

The second embodiment also makes it possible to prevent an unusual sound from being produced by contact of the front ends and the rear ends of the side support parts 24, 24 with the cover members 29, 29 when the occupant is seated.

Although the embodiments of the present invention have been described above, the present invention can be variously modified without departing from the gist of the present invention.

For example, the shapes of the first elastic body 25 and the second elastic bodies 26 are not limited to the shapes in the above embodiments.

The invention claimed is:

1. A vehicle seat comprising:
   a seat frame made of metal and having a central opening;
   a cushion pan made of an elastic synthetic resin and disposed in the central opening of the seat frame; and
   a seat cushion having a seat pad which supports the seat cushion, a lower side of the seat pad being supported by the cushion pan, wherein
   the cushion pan comprises,
      a front and rear support part extending from a front end of the seat cushion to a rear end thereof and disposed in a position to face a lower face of a femoral region of an occupant, and
      side support parts extending obliquely upward from right and left side edges of the front and rear support part, respectively, and disposed in a position to face a side portion of buttocks of the occupant,
   the front and rear support part and the side support parts are integrally formed together, and
   the vehicle seat further comprises,
      a first elastic body extending in a vehicle width direction and integrally formed with the side support parts, and
      a second elastic body extending in a front-to-rear direction and integrally formed with the front and rear support part.

2. The vehicle seat according to claim 1, wherein the first elastic body is disposed on an upper side of the second elastic body, and the first elastic body is disposed at a position that avoids an ischium of the occupant.

3. A vehicle seat comprising:

a seat frame made of metal and having a central opening;

a cushion pan made of an elastic synthetic resin and disposed in the central opening of the seat frame; and a seat cushion having a seat pad which supports the seat cushion, a lower side of the seat pad being supported by the cushion pan, wherein the cushion pan comprises, a front and rear support part extending from a front end of the seat cushion to a rear end thereof and disposed in a position to face a lower face of a femoral region of an occupant, side support parts extending obliquely upward from right and left side edges of the front and rear support part, respectively, and disposed in a position to face a side portion of buttocks of the occupant, the front and rear support part and the side support parts are integrally formed together, the vehicle sheet further comprises cover members that are fixed to the seat frame and extending outward from each side of the side support parts in a vehicle width direction, front ends of the cover members are aligned with front ends of the side support parts, and the cover members and the side support parts support the lower side of the seat pad in cooperation with each other, and the side support parts have no contact with the cover member.

\* \* \* \* \*